(12) United States Patent
Wessel

(10) Patent No.: US 6,615,688 B2
(45) Date of Patent: Sep. 9, 2003

(54) INTEGRATED TWIST-GRIP SWITCH

(75) Inventor: Robert Wessel, Würzburg (DE)

(73) Assignee: SRAM Deutschland GmbH (DE)

( * ) Notice: Subject to any disclaimer, the term of this patent is extended or adjusted under 35 U.S.C. 154(b) by 0 days.

(21) Appl. No.: 09/864,683

(22) Filed: May 24, 2001

(65) Prior Publication Data

US 2002/0002872 A1 Jan. 10, 2002

(30) Foreign Application Priority Data

May 25, 2000 (DE) .......................................... 100 25 887

(51) Int. Cl.[7] .............................................. B62K 21/26
(52) U.S. Cl. ..................................... 74/551.9; 74/502.2
(58) Field of Search ........................... 74/501.6, 502.2, 74/551.1, 551.9; 403/289, 290, 338, 344

(56) References Cited

U.S. PATENT DOCUMENTS

| | | | | |
|---|---|---|---|---|
| 4,535,649 A | * | 8/1985 | Stahel ........................ | 74/551.1 |
| 4,852,423 A | * | 8/1989 | Mikami et al. ............ | 74/551.9 |
| 5,579,848 A | * | 12/1996 | Hsu ............................ | 16/422 |
| 5,660,083 A | * | 8/1997 | Huang et al. ............ | 74/473.13 |
| 5,802,927 A | * | 9/1998 | Yu et al. ..................... | 74/489 |
| 6,041,895 A | * | 3/2000 | Mao .......................... | 188/24.22 |
| D430,072 S | * | 8/2000 | Harrison ................... | D12/114 |
| 6,112,618 A | * | 9/2000 | Yates ................... | 16/DIG. 12 |
| 6,131,484 A | * | 10/2000 | Wang ......................... | 74/543 |
| 6,209,413 B1 | * | 4/2001 | Chang ........................ | 74/489 |
| 6,389,929 B1 | * | 5/2002 | Calilung et al. ........... | 74/551.9 |

* cited by examiner

*Primary Examiner*—Thomas R. Hannon
*Assistant Examiner*—Vicky A. Johnson
(74) *Attorney, Agent, or Firm*—Milan Milosevic; Lisa Wunderlich

(57) ABSTRACT

A twist-grip switch for the actuation of bicycle gears is arranged in the grip region of a handlebar is fixed thereto by a clamping clip. The switch components, such as the grip end piece, twist-grip part, winding reel and switch housing, are arranged around the central bearing tube and form a complete grip unit. The bearing tube fits tautly on the handlebar and on one side is rigidly connected to the grip end piece by an overmolding connection and on the other side is fixed to the switch housing by means of a snap connection. The clamping clip prevents the snap connection from being opened in the mounted state. Furthermore, the grip end piece reliably assumes the intended position on the handlebar tube in relation to the switch housing, and it cannot be removed from this position by forces acting on it.

14 Claims, 6 Drawing Sheets

INTEGRATED TWIST-GRIP SWITCH

BACKGROUND OF THE INVENTION

1. Field of the Invention

The present invention relates to an integrated twist-grip switch for the shifting of bicycle gears, such as multi-speed hubs or dérailleur shifts.

2. Description of the Related Art

Twist-grip switches for the control of bicycle gears are generally preassembled and mounted on the bicycle, i.e., pushed onto the handlebar tube, in the preassembled state. The twist-grip switch is then adjusted and fixed on the handlebar. The attachment to the handlebar is usually carried out by a clamping device.

In a preassembled twist-grip switch, a plurality of switch components are assembled together, and a locking connection is often used, which is not releasable after the preassembled twist-grip is mounted on the handlebar tube.

However, before installation of the preassembled twist-grip switch on the handlebar tube, it is possible for the still releasable locking connection to loosen, thereby breaking apart the preassembly of the components and incurring an increase in the outlay in terms of assembly. For this reason, it is desired to make the locking connection more reliable.

SUMMARY OF THE INVENTION

It is an object of the present invention to increase the reliability of the fixing of the components in a preassembled unit. The object is achieved by a clamping clip. In addition to its function of fixing the switch on the handlebar tube, the clamping clip also prevents the locking connection from becoming loose.

Furthermore, switch housings constructed predominantly from plastics have problems of space in the region of a switch housing. Locking devices are located in the region of the housing to fix the components of the switch in the preassembled state. Moreover, it is necessary to clamp the switch on the handlebar tube. The plastic material alone does not have the strength necessary for this purpose, or creeping processes of the material are detrimental to a permanently reliable fixing of the switch on the handlebar tube. The clamping clip arranged in the housing solves the problem of connecting the switch to the handlebar tube. However, the strict separation between the interlocking of other components of the switch with the housing and the clamping of the switch to the handlebar requires a greater space requirement.

According to the present invention, the problem of space is solved by combining two functions and direct interaction between the respective operating elements. That is, the present invention includes radially elastic tongues arranged on the bearing tube which are equipped at the end with a locking profile to form a nonrotatable and nondisplaceable positive connection with a counterprofile on the switch housing. The twist-grip part, the winding reel, and also the switch housing together with the switch mechanism may be lined up via these elastic tongues for forming a preassembly which is mountable onto the bearing tube. This preassembly is secured against inadvertent breaking apart by the snap connection between the bearing tube and switch housing. The number of components of the twist-grip switch needed for the final mounting step on the handlebar is thereby markedly reduced. The arrangement of the clamping clip in the inside diameter of the switch housing with the accompanying screw allows the complete twist-grip switch to one piece ready for mounting. Tightening the screw on the clamping clip ensures a secure fit of the twist-grip switch, including a grip end piece, on the handlebar. The bearing tube or the twist-grip part together with winding reel may be demounted again or uncoupled from the switch housing only after the removal of the clamping clip. To ensure a play-free fit on the handlebar, the inside diameter on the bearing tube and on the grip end piece has a correspondingly narrow dimension or tolerance. Controlled deformation of the inner region may also be used to eliminate the sensitivity to tolerance. Thus, the inner surface of the bearing tube may include at least a part region, preferably axially adjacent to the elastic tongues, having a shape which is not circular, but oval or polygonal to achieve a play-free fit during adaption to the round handlebar cross section. The same play-free fit may be achieved when this bearing tube inner region is equipped with narrow elevations which run essentially in the axial direction which undergo deformation during mounting and then fit firmly. Perforations may be arranged on the bearing tube in the region of the overlap of the grip end piece so that when the grip end piece is being attached material of the grip end piece projects into the inside diameter of the bearing tube. During assembly of the preassembly onto the handlebar, the material projecting into the inside diameter experiences a deformation and is pressed on.

The bearing tube is prolonged in the direction of the grip end piece. The grip end piece is fixed to the bearing tube by a chemical overmolding connection. In contrast to the prior art described, the bearing tube of the present invention is not connected fixedly in terms of rotation to the elastic twist-grip part and the winding reel. Rather, the bearing tube serves as a mounting for these and forms, with the fixed intermediate ring, the necessary axial abutment for the twist-grip part connected fixedly in terms of rotation to the winding reel.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like references denote similar elements throughout the several views.

DETAILED DESCRIPTION OF THE PRESENTLY PREFERRED EMBODIMENTS

Figure 1:
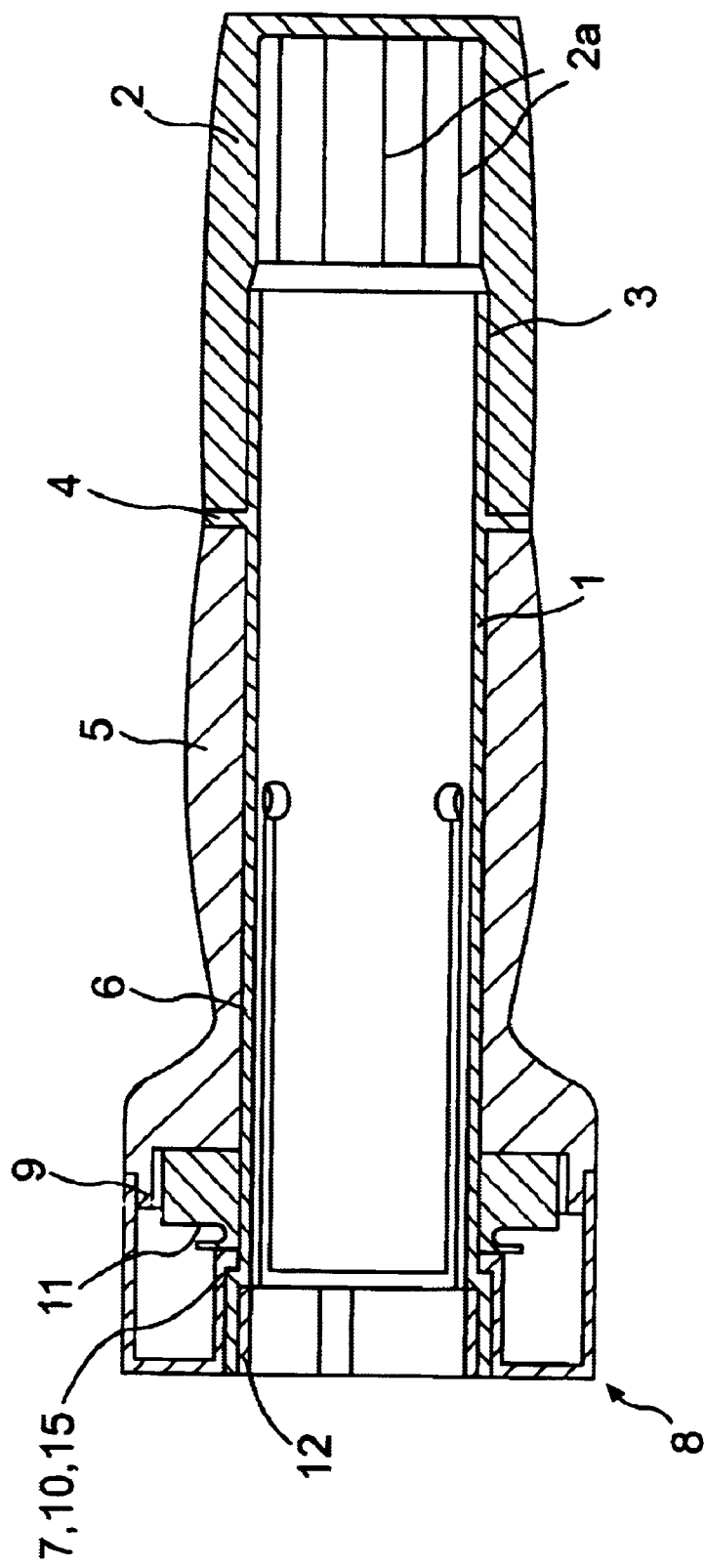
FIG. 1 is a longitudinal sectional view of a twist-grip switch with the grip and switch components arranged around a bearing tube according to an embodiment of the present invention.

FIG. 1 is a longitudinal sectional view of a twist-grip switch according to the present invention (the twist-grip switch may also be referred to as a twist-grip shifter). The components are arranged essentially around a bearing tube 1 made of hard plastic. The inside diameter of the bearing tube 1 is dimensioned to ensure a play-free fit on a handlebar tube of a bicycle. A grip end piece 2 made of an elastomeric material is rigidly connected to the bearing tube 1 by, for example, an overmolding connection 3 so that the grip end piece 2 is fixed with respect to rotation relative to the bearing tube 1. That portion of the rotationally fixed grip end piece 2 which projects beyond the bearing tube 1 has a smaller inside diameter than the bearing tube 1, so that it fits on the handlebar end free of play or with tension. The outer contour of the grip end piece 2 has a slightly convex shape to improve the ergonomics.

Figure 5:
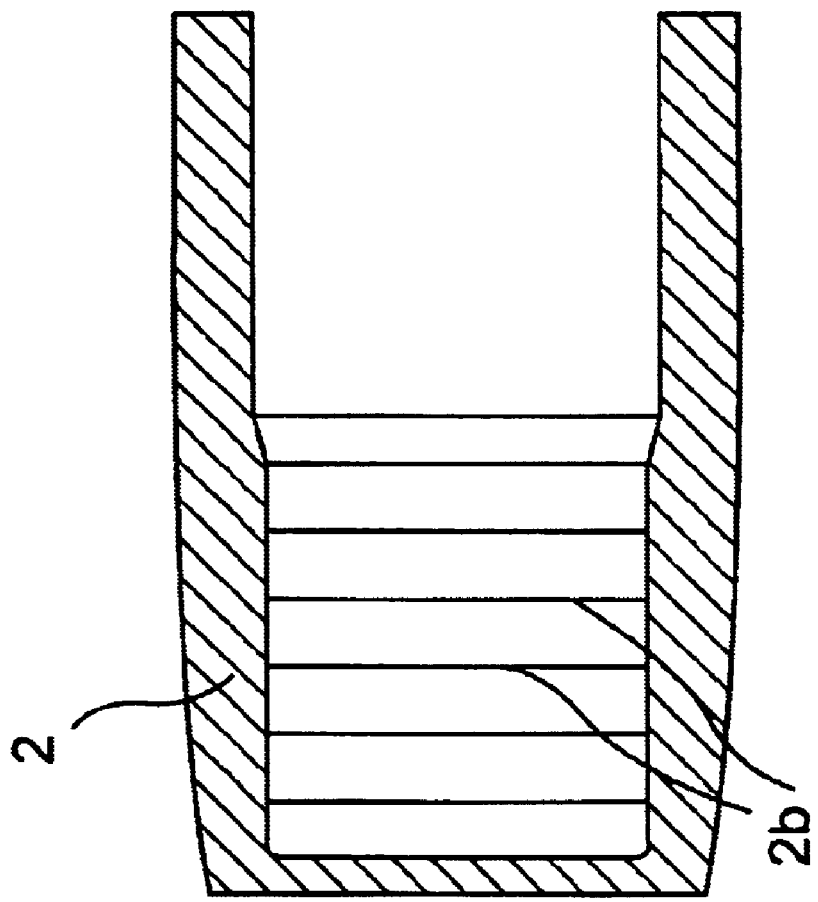
FIG. 5 is a longitudinal sectional view of an end grip piece according to another embodiment of the present invention.

Furthermore, the inside diameter surface of the grip end piece 2 in the portion that projects beyond the bearing tube 1 includes deformable elevations 2a extending axially. Accordingly, the grip end piece 2 contacts the handlebar tube in axial regions. FIG. 5 shows a further embodiment in which the deformable elevations 2b are circumferential.

An intermediate disk 4 fits firmly on the bearing tube 1. Alternatively, the intermediate disk 4 may be produced in one piece with the bearing tube 1. This intermediate disk 4 is an axial abutment for the grip end piece 2 and a twist-grip part 5 arranged on the bearing tube 1. The intermediate disk 4 reduces the axial friction otherwise occurring between the grip end piece 2 and the twist-grip part 5.

Figure 6:
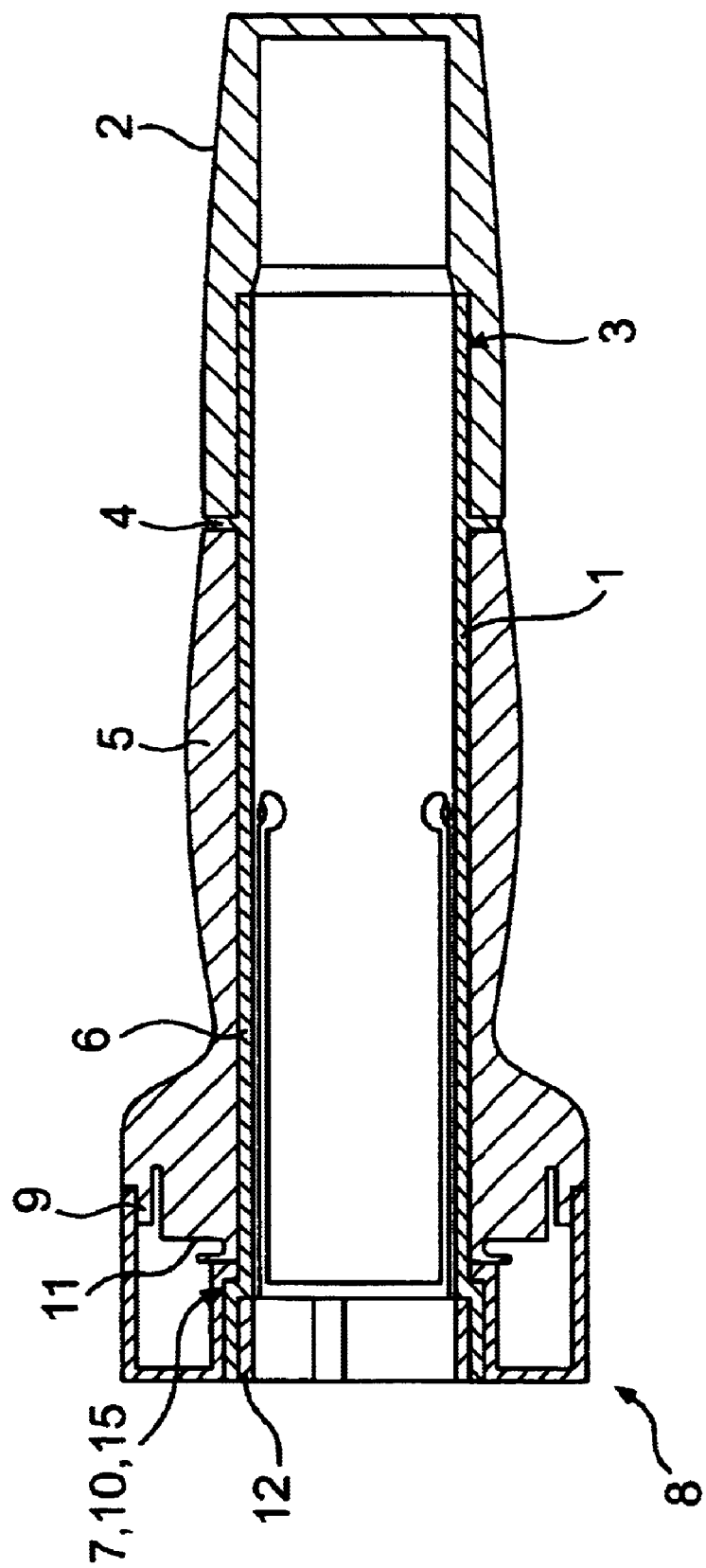
FIG. 6 is a longitudinal sectional view of a twist-grip switch according to another embodiment of the present invention.

Two radially elastic tongues 6 with locking profiles 7 are arranged on the bearing tube 1. The elastic tongues 6 and the locking profile 7 are deflectable radially inward and form a snap connection 10 with the corresponding counterprofiles 15 in a switch housing 8. The twist-grip part 5 and a winding reel 11, which is connectable for changing the gear of a bicycle transmission via a Bowden cable, may be slipped on over the elastic tongues 6 of the bearing tube 1 during preassembly and are then secured against unintentional removal via the locking profiles 7. After the twist-grip part 5 and the winding reel 11 are on the bearing tube, the locking profiles 7 are snapped in the switch housing 8. The clamping clip 12 is then inserted axially into the switch housing 8 within the elastic tongues 6. The twist-grip switch is thus secured against rotation or displacement after final mounting on the handlebar and after a screw (not shown here) on the clamping clip 12 is tightened. Demounting of the switch housing 8 and of the twist-grip part 5 together with the winding reel 11 is only possible again after the removal of the clamping clip 12. An edge 9 of the twist-grip part 5 which faces the switch housing 8 projects into the switch housing 8 and, if appropriate, designed as a labyrinth, also forms an appropriate seal. The length and the inside diameter of the twist-grip part 5 are dimensioned such that easy twisting on the bearing tube 1 is ensured. The winding reel 11 is connected fixedly in terms of rotation to the twist-grip part 5 as shown in FIG. 1 or may form a common structural part with twist-grip part 5 as shown in FIG. 6. The outer shape of the twist-grip part 5 is convex in the grip region or has an ergonomic grip contour matched to the hand.

Figure 2:
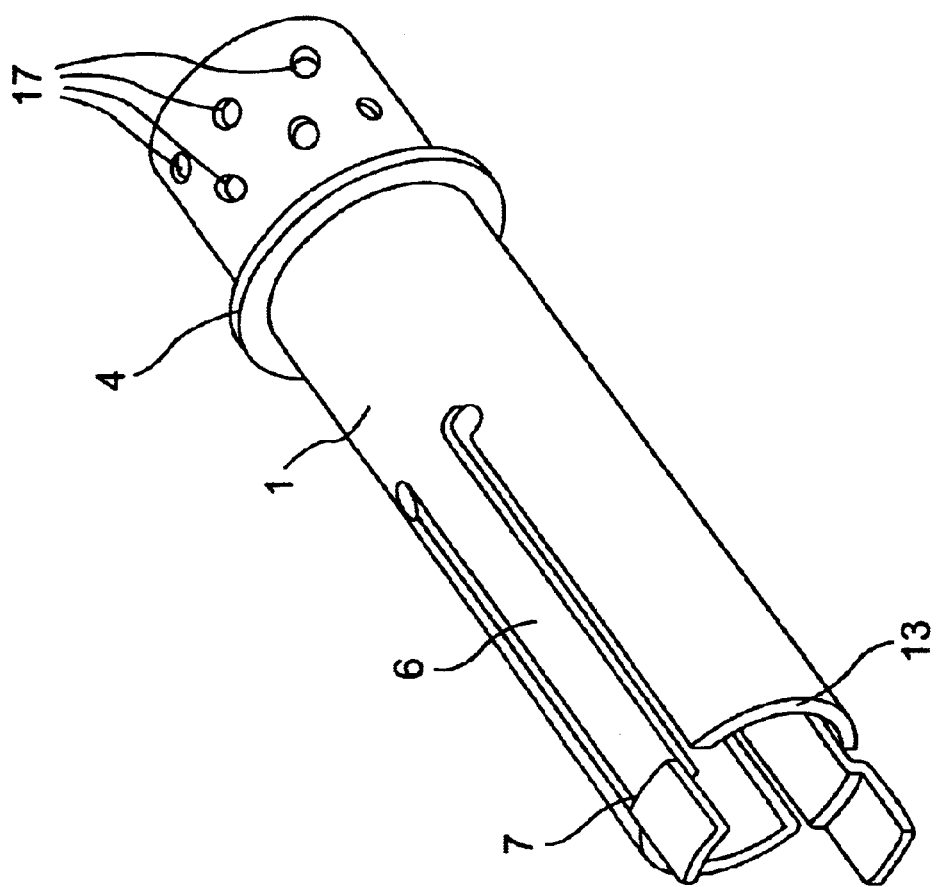
FIG. 2 is a perspective view of the bearing tube of the twist-grip switch of FIG. 1 with a fixed intermediate disk and elastic tongues equipped with a locking profile.

FIG. 2 is a perspective view of the bearing tube 1 together with the integrated intermediate disk 4. The transition of the bearing tube 1 to the radially elastic tongues 6 is rounded to avoid a notch effect. The elastic tongues 6 have the locking profile 7 at their ends. The bearing tube 1 together with the locking profile 7 is held in the switch housing 8 in the pulling or tension direction. In the pushing direction, the bearing tube 1 is supported on the switch housing 8 via end faces 13 of the bearing tube 1.

FIG. 2 further shows that the portion of the bearing tube 1 which receives the grip end piece 2 include perforations 17 through which the elastic material of the grip end piece deforms when the grip end piece 2 is arranged on the bearing tube 1. This arrangement prevents the grip end piece 2 from moving relative to the bearing tube 1 and the handlebar.

Figure 3:
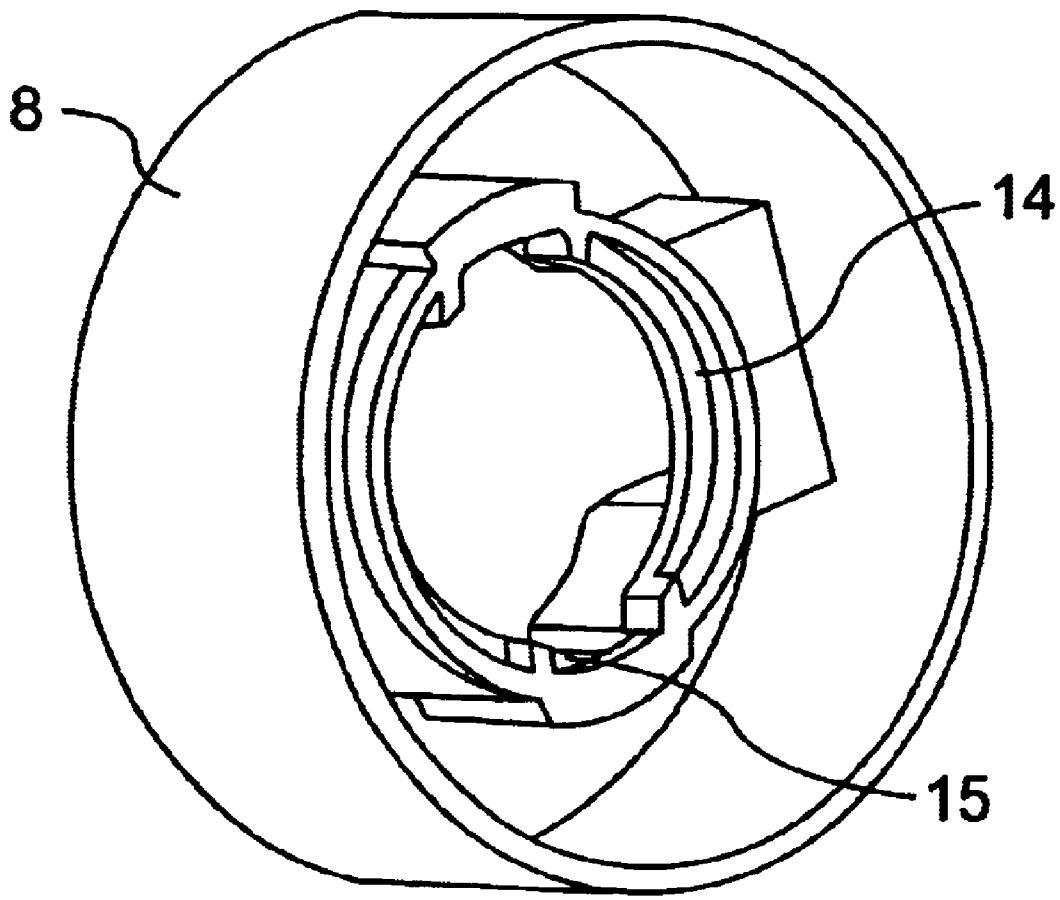
FIG. 3 is a perspective view of a switch housing of the twist-grip switch of FIG. 1 according to an embodiment of the present invention with countersurfaces for receiving the locking profile of the bearing tube.

FIG. 3 is a perspective view of the switch housing 8 showing an abutment 14 which supports the end face 13 of the bearing tube 1. The locking profile 7 on the elastic tongues 6 is received by the counterprofile 15. The bearing tube 1 is thereby prevented, in the mounted state, from rotating and from being pulled out from the switch housing 8. Furthermore, after the clamping clip 12 is fastened a secure attachment of the twist-grip switch to the handlebar tube is ensured.

Figure 4:
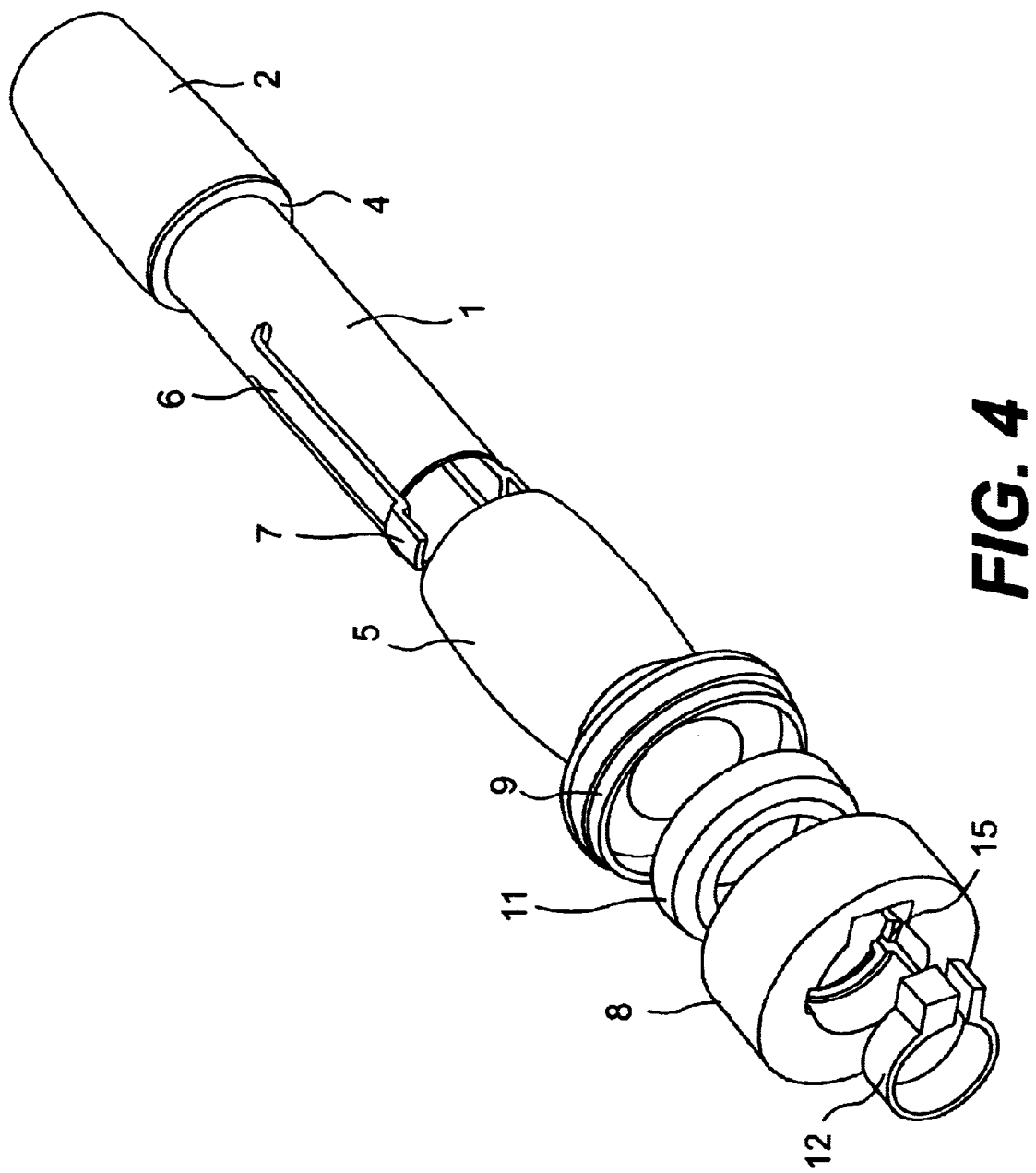
FIG. 4 is a perspective exploded view of the components of the twist-grip switch according to FIG. 1 before preassembly.

FIG. 4 is an exploded illustration of the switch components prior to assembly. The grip end piece 2 is already rigidly connected to the bearing tube 1. The elastic tongues 6 together with the locking profiles 7 are pressed together, i.e., radially inward, until they fit through the inside diameter of the twist-grip part 5 and of the winding reel 11 and snap into the recesses of the counterprofiles 15 on the switch housing 8 which contains the remaining switch mechanism. After the clamping clip 12 has been inserted into the switch housing 8 and a screw, not shown here, has been attached, the preassembly of the twist-grip switch is concluded and it may therefore be mounted in one piece on the handlebar tube. During preassembly, a gear-shift cable assembly may be suspended directly in the winding reel or subsequently through an aperture in the switch housing 8. The preassembled twist-grip switch forms a compact structure unit which is prevented from being removed from the handlebar by the clamping clip 12. Accordingly, the clamping clip 12 must be removed and elastic tongues 6 being pressed together before the removal of the twist-grip switch is possible.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. An integrated twist-grip shifter mountable on a handlebar tube of a bicycle for the actuation of bicycle gears via a cable assembly, comprising:

a shifter housing secured to the handlebar tube;

a bearing tube connected to said shifter housing such that said bearing tube is fixed with respect to rotation and axially nondisplaceable relative to said shifter housing;

a winding reel rotatably arranged in said shifter housing and on said bearing tube for actuating the cable assembly;

a twist-grip part rotatably arranged on said bearing tube and actuatable for rotation about said bearing tube, said twist-grip pan being connected to said winding reel such that said winding reel rotates with said twist-grip part; and a grip end piece fixedly connectable relative to the handlebar rube, at least a portion of said grip end piece directly mounted to said bearing rube such that said grip end piece is axially and rotatably nondisplaceable relative to said shifter housing.

2. The integrated twist-grip shifter of claim 1, wherein said bearing tube and said shifter housing are connected via a releasable connection.

3. The integrated twist-grip shifter of claim 2, wherein said releasable connection includes a snap connection which is held in a connected position after the twist-grip shifter has been mounted on the handlebar.

4. The integrated twist-grip shifter of claim 1, wherein said grip end piece comprises an elastic material produced via overmolding and said grip end piece is a fixed integral part of said bearing tube such that said grip end piece is secured against axial displacement and rotation relative to said bearing tube.

5. The integrated twist-grip shifter of claim 1, wherein said grip end piece includes a portion projecting beyond an axial end of said bearing tube.

6. The integrated twist-grip shifter of claim 5, wherein said portion projecting beyond an axial end of said bearing tube has an inside-diameter region arranged for forming a play-free fit on the handlebar.

7. The integrated twist-grip shifter of claim 5, wherein said portion projecting beyond an axial end of said bearing tube has an inside diameter region having deformable elevations for forming a play-free fit on the handlebar.

8. The integrated twist-grip shifter of claim 5, wherein a region of said grip end piece projecting beyond the axial region of the bearing tube has inner surface regions which contact the handlebar tube when said twist-grip switch is mounted on the handlebar tube, said inner surface regions including one of axial and circumferential regions.

9. The integrated twist-grip shifter of claim 1, wherein a region of said bearing tube for receiving said grip end piece includes perforations through which an elastic material of said grip end piece projects inward.

10. The integrated twist grip shifter of claim 1, wherein said twist-grip part, said winding reel and said shifter housing are held together by the connection of said bearing tube to said shifter housing to form an operational unit.

11. The integrated twist-grip shifter of claim 1, further comprising an intermediate disk arranged on said bearing tube between said twist-grip part and said grip end piece, said intermediate disk including an axial abutment for said twist-grip part and reducing friction between said grip end piece and said twist-grip part.

12. The integrated twist-grip shifter of claim 1, wherein said shifter housing includes a collar, said twist-grip part driving said winding reel such that said winding reel abuts axially against said collar, an axial play of said twist-grip part being determined by a length of said bearing tube.

13. The integrated twist-grip shifter of claim 1, wherein at least one of said grip end piece and said twist-grip part comprises an elastomeric material having a contour having one of a rounded contour and an ergonomic contour.

14. The integrated twist-grip shifter of claim 1, wherein said twist grip part and said winding reel are produced in one piece as one structural part.

\* \* \* \* \*